United States Patent
Yoshimura et al.

(10) Patent No.: US 11,492,264 B2
(45) Date of Patent: Nov. 8, 2022

(54) SEED CRYSTALS, METHOD OF PRODUCING SEED CRYSTALS, METHOD OF PRODUCING SEED CRYSTALS ATTACHMENT SUPPORT, AND METHOD OF PRODUCING ZEOLITE MEMBRANE COMPLEX

(71) Applicant: NGK INSULATORS, LTD., Nagoya (JP)

(72) Inventors: Ryotaro Yoshimura, Nagoya (JP); Aya Miura, Nagoya (JP); Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 442 days.

(21) Appl. No.: 16/298,240

(22) Filed: Mar. 11, 2019

(65) Prior Publication Data

US 2019/0292062 A1   Sep. 26, 2019

(30) Foreign Application Priority Data

Mar. 23, 2018 (JP) .............................. JP2018-056677
Mar. 8, 2019 (JP) .............................. JP2019-042381

(51) Int. Cl.
*C01B 37/04* (2006.01)
*B01D 53/22* (2006.01)
(Continued)

(52) U.S. Cl.
CPC ............ *C01B 37/04* (2013.01); *B01D 53/228* (2013.01); *B01D 67/0069* (2013.01);
(Continued)

(58) Field of Classification Search
CPC .... C01B 37/04; B01D 53/228; B01D 71/028; B01D 67/0069; B01D 2323/24;
(Continued)

(56) References Cited

U.S. PATENT DOCUMENTS

| | | | | |
|---|---|---|---|---|
| 7,909,917 B2 * | 3/2011 | Nonaka | ................... | C04B 41/52 96/11 |
| 2012/0004490 A1 * | 1/2012 | Takamatsu | ............... | B01J 38/14 585/643 |

(Continued)

FOREIGN PATENT DOCUMENTS

| | | | | |
|---|---|---|---|---|
| WO | 2014/157324 A1 | 10/2014 | | |
| WO | WO-2016121887 A1 * | 8/2016 | ............... | B01J 20/20 |

*Primary Examiner* — Anthony J Zimmer
(74) *Attorney, Agent, or Firm* — Burr & Brown, PLLC

(57) ABSTRACT

Seed crystals are crystals of zeolite to be attached onto a support in production of a zeolite membrane complex including the support and a zeolite membrane formed on the support. The specific surface area of the seed crystals is not smaller than 10 m²/g and not larger than 150 m²/g. The strength obtained from a crystal component at a diffraction angle 2θ indicating a maximum peak in a range of diffraction angle 2θ from 12° to 25° in an X-ray diffraction pattern obtained by emitting X-ray to the seed crystals is not less than once and not more than 30 times that obtained from an amorphous component. It is thereby possible to improve adherence of the seed crystals to the support.

10 Claims, 2 Drawing Sheets

(51) Int. Cl.
    *B01D 71/02*      (2006.01)
    *B01D 67/00*      (2006.01)

(52) U.S. Cl.
    CPC ........ *B01D 71/028* (2013.01); *B01D 2323/24* (2013.01); *C01P 2002/72* (2013.01); *C01P 2006/11* (2013.01); *C01P 2006/12* (2013.01)

(58) Field of Classification Search
    CPC ........ B01D 2256/245; B01D 2257/504; B01D 67/0051; B01D 69/02; C01P 2006/11; C01P 2006/12; C01P 2002/72; Y02P 20/151
    See application file for complete search history.

(56)                References Cited

U.S. PATENT DOCUMENTS

2015/0010704 A1*  1/2015  Hagio .................... B01D 69/10
                                                              423/709
2016/0009564 A1*  1/2016  Hagio ..................... C01B 37/02
                                                              427/430.1
2016/0016146 A1   1/2016  Hagio et al.
2017/0296980 A1* 10/2017  Noda ..................... B01J 20/186
2018/0001276 A1*  1/2018  Shibata .............. B01D 67/0046

\* cited by examiner

SEED CRYSTALS, METHOD OF PRODUCING SEED CRYSTALS, METHOD OF PRODUCING SEED CRYSTALS ATTACHMENT SUPPORT, AND METHOD OF PRODUCING ZEOLITE MEMBRANE COMPLEX

TECHNICAL FIELD

The present invention relates to seed crystals of zeolite used in production of a zeolite membrane complex.

BACKGROUND ART

Currently, various kinds of researches and developments are carried out on applications such as separation of specific gases, adsorption of molecules, and the like using zeolite in the form of a zeolite membrane complex obtained by forming a zeolite membrane on a support. In formation of the zeolite membrane, for example, a support is immersed into a solution in which seed crystals of zeolite are dispersed, and then the seed crystals are attached onto the support. Then, hydrothermal synthesis or the like is performed in a state where the support with the seed crystals attached thereto is immersed in a precursor solution. This causes the zeolite to grow from the seed crystals as a nucleus, and the zeolite membrane is thereby formed on the support.

On the other hand, in a case where a zeolite membrane is attached to a vertical plane or the like of a support, if the adhesion of seed crystals to the support is weak, there is a possibility that the seed crystals cannot be uniformly attached to the vertical plane or the like of the support and a uniform zeolite membrane cannot be formed. An example of seed crystals having weak adhesion is seed crystals of aluminophosphate (AlPO)-based zeolite. WO 2014/157324 (Document 1) discloses a technique for suitably attaching seed crystals of AlPO-based zeolite to inner surfaces of through holes of a support by arranging an alkali metal or an alkali earth metal on the inner surfaces of the through holes in a monolith support having a substantially columnar shape, which is provided with the plurality of through holes extending in a longitudinal direction.

In formation of the zeolite membrane in Document 1, it is necessary to prepare a special support with the alkali metal or the like arranged on its surface, instead of a general-type support, and there is a possibility that production of a zeolite membrane complex may be complicated.

SUMMARY OF INVENTION

The present invention is intended for seed crystals of zeolite, and it is an object of the present invention to improve adherence of seed crystals to a support.

The seed crystals of zeolite according to one preferred embodiment of the present invention is to be attached onto a support in production of a zeolite membrane complex comprising the support and a zeolite membrane formed on the support. The specific surface area of the seed crystals is not smaller than 10 m$^2$/g and not larger than 150 m$^2$/g. The strength obtained from a crystal component at a diffraction angle 2θ indicating a maximum peak in a range of diffraction angle 2θ from 12° to 25° in an X-ray diffraction pattern obtained by emitting X-ray to the seed crystals is not less than once and not more than 30 times that obtained from an amorphous component. By the present invention, it is possible to improve adherence of the seed crystals to the support.

Preferably, the seed crystals contain any two or more of silicon, aluminum, and phosphorus, or silicon. More preferably, the seed crystals contain at least aluminum, phosphorus, and oxygen.

Preferably, the tap density of the seed crystals is not lower than 0.2 g/cm$^3$ and not higher than 1.0 g/cm$^3$.

Preferably, the seed crystals are attached onto a substantially vertical plane or a downward-facing plane in production of the zeolite membrane complex, out of a surface of the support.

Preferably, the support is porous.

Preferably, the support is an alumina sintered body or a mullite sintered body.

The present invention is also intended for a method of producing seed crystals of zeolite. The method of producing seed crystals of zeolite according to one preferred embodiment of the present invention includes a) producing zeolite by hydrothermal synthesis and acquiring original crystals from the zeolite and b) pulverizing the original crystals, to thereby form seed crystals in which the specific surface area is not smaller than 10 m$^2$/g and not larger than 150 m$^2$/g and the strength obtained from a crystal component at a diffraction angle 2θ indicating a maximum peak in a range of diffraction angle 2θ from 12° to 25° in an X-ray diffraction pattern obtained by emitting X-ray to the seed crystals is not less than once and not more than 30 times that obtained from an amorphous component. By the present invention, it is possible to improve adherence of the seed crystals to the support.

Preferably, the operation b) includes b1) pulverizing the original crystals by a ball mill or a bead mill rotating at a first number of rotations and b2) pulverizing the original crystals which are pulverized in the operation b1), by the ball mill or the bead mill rotating at a second number of rotations which is lower than the first number of rotations, to thereby form the seed crystals.

Preferably, when an aluminum source is used in the hydrothermal synthesis in the operation a), aluminum hydroxide, aluminum alkoxide or alumina sol is used as the aluminum source.

The method of producing seed crystals of zeolite according to another preferred embodiment of the present invention includes a) producing zeolite by hydrothermal synthesis and acquiring original crystals from the zeolite, b1) pulverizing the original crystals by a ball mill or a bead mill rotating at a first number of rotations, and b2) pulverizing the original crystals which are pulverized in the operation b1), by the ball mill or the bead mill rotating at a second number of rotations which is lower than the first number of rotations, to thereby form the seed crystals. By the present invention, it is possible to improve adherence of the seed crystals to the support.

Preferably, when an aluminum source is used in the hydrothermal synthesis in the operation a), aluminum hydroxide, aluminum alkoxide or alumina sol is used as the aluminum source.

The present invention is still also intended for a method of producing seed crystals attachment support. The method of producing seed crystals attachment support according to one preferred embodiment of the present invention includes preparing a support and attaching seed crystals produced by the above-described method of producing seed crystals of zeolite to the support.

The present invention is yet also intended for a method of producing a zeolite membrane complex. The method of producing a zeolite membrane complex according to one preferred embodiment of the present invention includes immersing seed crystals attachment support produced by the above-described method of producing seed crystals attachment support in a precursor solution, and causing zeolite to grow from the seed crystals by hydrothermal synthesis, to thereby form a zeolite membrane on the support, and removing a structure-directing agent from the zeolite membrane.

These and other objects, features, aspects and advantages of the present invention will become more apparent from the following detailed description of the present invention when taken in conjunction with the accompanying drawings.

DESCRIPTION OF EMBODIMENTS

Figure 1:
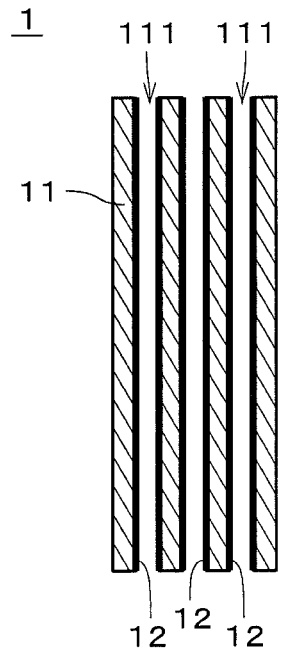
FIG. 1 is a cross section showing a zeolite membrane complex.

FIG. 1 is a cross section showing a zeolite membrane complex 1 produced by using seed crystals in accordance with one embodiment of the present invention. The zeolite membrane complex 1 includes a support 11, and zeolite membranes 12 formed on the support 11. In the exemplary case shown in FIG. 1, the support 11 is a monolith support having a substantially columnar shape which is provided with a plurality of through holes 111 extending in a longitudinal direction (i.e., an up-and-down direction in this figure). A cross section perpendicular to the longitudinal direction of each of the through holes 111 (i.e., cells) is, for example, substantially circular. In FIG. 1, the diameter of each through hole 111 is larger than the actual diameter, and the number of through holes 111 is smaller than the actual number. The zeolite membrane 12 is formed on an inner surface of each through hole 111, and covers substantially the entire inner surface of the through hole 111. In FIG. 1, the zeolite membrane 12 is represented by a thick line. Further, the shape of the support 11 may be, for example, honeycomb-like, flat plate-like, tubular, cylindrical, columnar, prismatic, or the like.

In the present embodiment, the support 11 is a porous one that gas can permeate, and the zeolite membrane 12 is a gas separation membrane. The zeolite membrane 12 may be used for other applications, as a molecular separation membrane using a molecular sieving function. For example, the zeolite membrane 12 can be used as a pervaporation membrane. The zeolite membrane complex 1 may be further used for other applications. The support 11 may be formed of another material that gas does not permeate (e.g., non-porous one).

As the material for the support 11, various materials may be adopted only if the materials ensure chemical stability in the step of foi ling the zeolite membranes 12 on the surface thereof. The material for the support 11 may be, for example, a ceramic sintered body, a metal, organic polymer, glass, carbon, or the like. Examples of the ceramic sintered body include alumina, silica, mullite, zirconia, titania, yttria, silicon nitride, silicon carbide, and the like. Examples of the metal include aluminum, iron, bronze, stainless steel, and the like. Examples of the organic polymer include polyethylene, polypropylene, polytetrafluoroethylene, polysulfone, polyimide, and the like.

The support 11 may contain an inorganic binder. As the inorganic binder, at least one of titania, mullite, easily sinterable alumina, silica, glass frit, a clay mineral, and easily sinterable cordierite may be used.

The length of the support 11 is, for example, 10 cm to 200 cm. The outer diameter of the support 11 is, for example, 0.5 cm to 30 cm. When the support 11 has a monolith-like shape, the distance between central axes of adjacent through holes 111 is, for example, 0.3 mm to 10 mm. When the support 11 has a tubular or flat plate-like shape, the thickness of the support 11 is, for example, 0.1 mm to 10 mm.

The surface roughness (Ra) of the support 11 is, for example, 0.1 μm to 5.0 μm, and preferably 0.2 μm to 2.0 μm.

When the zeolite membrane 12 is used as a gas separation membrane, the support 11 is porous. In this case, preferably, the average pore diameter of the support 11 in the vicinity of a surface on which the zeolite membrane 12 is formed is smaller than that of the other portions. In order to realize such a structure, the support 11 has a multilayer structure. When the support 11 has a multilayer structure, the materials for the respective layers may be those described above, and may be the same or different from each other. The average pore diameter of the support 11 can be measured by using a mercury porosimeter, a perm porometer, a nano-perm porometer, or the like. The average pore diameter of the support 11 is, for example, 0.01 μm to 70 μm, and preferably 0.05 μm to 25 μm. The porosity of the support 11 in the vicinity of the surface on which the zeolite membrane 12 is formed is preferably 20% to 60%. Such a structure is preferably provided in a range from 1 μm to 50 μm from the surface thereof.

As to the pore diameter distribution of the support 11, D5 is, for example, 0.01 μm to 50 μm, D50 is, for example, 0.05 μm to 70 μm, and D95 is, for example, 0.1 μm to 2000 μm.

The thickness of the zeolite membrane 12 is, for example, 0.05/μm to 30/μm, preferably 0.1 μm to 20 μm, and further preferably 0.5 μm to 10 μm. When the thickness of the zeolite membrane 12 is increased, the gas separating performance increases. When the thickness of the zeolite membrane 12 is reduced, the gas permeation rate increases. The surface roughness (Ra) of the zeolite membrane 12 is, for example, not larger than 5 μm, preferably not larger than 2 μm, more preferably not larger than 1 μm, and further preferably not larger than 0.5 μm.

The zeolite membrane 12 is formed of, for example, SAT-type zeolite. In other words, the zeolite membrane 12 is formed of zeolite having a structure code of "SAT" which is designated by the International Zeolite Association. The zeolite membrane 12 is not limited to the SAT-type zeolite, but may also be zeolite having any one of other structures. The zeolite membrane 12 may be formed of, for example, AEI-type, AFN-type, AFX-type, CHA-type, DDR-type, ERI-type, GIS-type, LEV-type, LTA-type, RHO-type zeolite, or the like. The zeolite membrane 12 contains any two or more of silicon (Si), aluminum (Al), and phosphorus (P), or Si. In the present embodiment, the zeolite membrane 12 contains at least Al, P, and O (oxygen). In other words, the zeolite membrane 12 is formed of aluminophosphate (AlPO)-based zeolite constituted of Al atoms, P atoms, and O atoms. The maximum number of membered rings of the zeolite forming the zeolite membrane 12 is preferably 6 or 8. More preferably, maximum number of membered rings of the zeolite forming the zeolite membrane 12 is 8. The pore diameter of the zeolite membrane 12 is, for example, 0.30 nm×0.55 nm. As described earlier, as the material for the support 11, various materials may be adopted. When the zeolite membrane 12 is formed of AlPO-based zeolite, it is preferable that the support 11 should be an alumina sintered body or a mullite sintered body.

Figure 2:
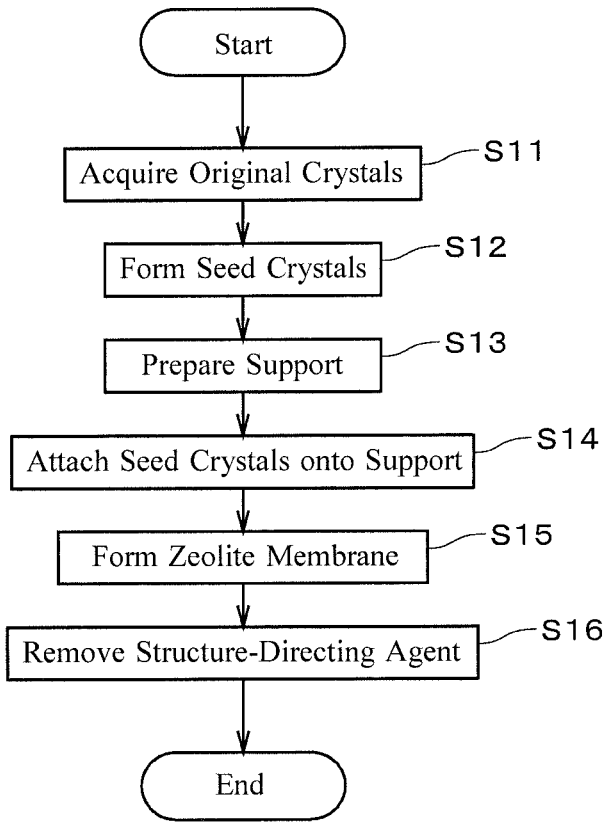
FIG. 2 is a flowchart showing an operation flow for producing the zeolite membrane complex.
Figure 3:
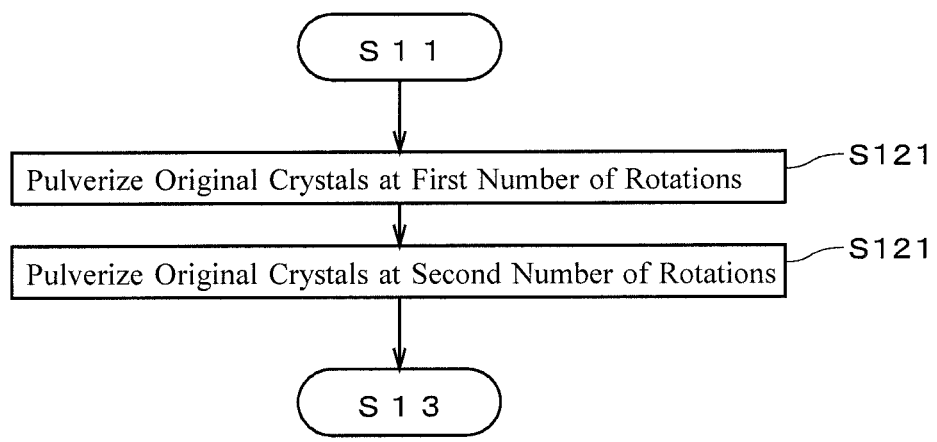
FIG. 3 is another flowchart showing the operation flow for producing the zeolite membrane complex.

FIGS. 2 and 3 are flowcharts showing an exemplary operation flow for producing the zeolite membrane complex 1. First, zeolite powder is produced by hydrothermal synthesis, and original crystals are acquired from the zeolite powder (Step S11). The original crystals are, for example, SAT-type zeolite. The original crystals contain any two or more of Si, Al, and P, or Si. In the present embodiment, the original crystals contain at least Al, P, and O. In other words, the original crystals are ALPO-based zeolite. In Step S11, as an aluminum source in the hydrothermal synthesis, for example, aluminum hydroxide, aluminum alkoxide, or alumina sol is used. In Step S11, the zeolite powder may be used as the original crystals as is, and the original crystals may be acquired by processing the zeolite powder through pulverization or the like.

Subsequently, by pulverizing the original crystals, seed crystals are formed (Step S12). As shown in FIG. 3, in Step S12, for example, the original crystals are put into a ball mill or a bead mill in a state of being dispersed in a liquid such as pure water or the like. Then, the original crystals are pulverized for a predetermined time by the ball mill or the bead mill rotating at a first number of rotations (Step S121). Next, the number of rotations of the ball mill or the bead mill is changed to a second number of rotations which is lower than the first number of rotations. The ratio of the second number of rotations to the first number of rotations is, for example, not lower than 15% and not higher than 80%. The ratio is more preferably not lower than 20% and not higher than 70%, and further preferably not lower than 30% and not higher than 60%.

Then, by pulverizing the original crystals which have been pulverized in Step S121 for a predetermined time by the ball mill or the bead mill rotating at the second number of rotations, the seed crystals are formed (Step S122). The pulverization time for the original crystals in Step S12 is, for example, not shorter than 2 days and not longer than 13 days. The pulverization time for the original crystals is preferably not shorter than 2 days and not longer than 7 days. The pulverization time in Step S121 is, for example, not shorter than 5 hours and not longer than 48 hours. The pulverization time is more preferably not shorter than 10 hours and not longer than 40 hours, and further preferably not shorter than 15 hours and not longer than 30 hours.

The seed crystals acquired in Step S12 are, for example, SAT-type zeolite. The seed crystals contain any two or more of Si, Al, and P, or Si. In the present embodiment, the seed crystals contain at least Al, P, and O. In other words, the seed crystals are AlPO-based zeolite. The specific surface area of the seed crystals is, for example, not smaller than 10 $m^2/g$ and not larger than 150 $m^2/g$. The specific surface area of the seed crystals is obtained by single-point BET method.

Further, the strength obtained from a crystal component at a diffraction angle $2\theta$ indicating a maximum peak in a range of diffraction angle $2\theta$ from 12° to 25° in an X-ray diffraction pattern obtained by emitting X-ray to the seed crystals (i.e., peak strength) is, for example, not less than once and not more than 30 times that obtained from an amorphous component. More preferably, the strength obtained from the crystal component is not less than once and not more than 20 times that obtained from the amorphous component. Further preferably, the strength obtained from the crystal component is not less than 1.2 times and not more than 20 times that obtained from the amorphous component. It is known that the zeolite crystals indicate a strong diffraction peak in the range of diffraction angle $2\theta$ from 12° to 25° depending on the crystal structure. For this reason, it is possible to evaluate the crystal component and the amorphous component by adopting the maximum peak in the range of diffraction angle $2\theta$ from 12° to 25° as an evaluation object.

The X-ray used for the X-ray diffraction is a CuK $\alpha$ line. Further, an output of the X-ray is 600 W. By defining the type of X-ray and the output thereof, it is possible to quantitatively evaluate the crystal component and the amorphous component. In the X-ray diffraction, it is assumed that the tube voltage is 40 kV, the tube current is 15 mA, and the scanning speed is 5°/min, the scanning step is 0.02°. As a detector, a scintillation counter is used. It is assumed that the divergence slit is 1.25°, the scattering slit is 1.25°, the receiving slit is 0.3 mm, the incident solar slit is 5.0°, and the light-receiving solar slit is 5.0°. A monochromator is not used, and as a CuK $\beta$ line filter, used is a nickel foil having a thickness of 0.015 mm. For the measurement of the X-ray diffraction pattern, for example, MiniFlex600 manufactured by Rigaku Corporation can be used. Further, the measurement of the X-ray diffraction pattern is performed in a state where a sample holder having sufficient depth is densely charged with measurement powder.

The strength obtained from the amorphous component is indicated by the line of the bottom in the X-ray diffraction pattern, i.e., the height of a background noise component. The strength obtained from the crystal component is indicated by the height obtained by subtracting the height indicating the strength obtained from the amorphous component from the height in the X-ray diffraction pattern. The above-described line of the bottom in the X-ray diffraction pattern can be obtained, for example, by the Sonneveld-Visser method or the spline interpolation method.

The tap density of the seed crystals acquired in Step S12 is, for example, not lower than 0.2 $g/cm^3$ and not higher than 1.0 $g/cm^3$. With this tap density, it is possible to densely attach the seed crystals to the support 11. Further, the measurement for the tap density is performed in accordance with "JIS R 1628".

Subsequently, the support 11 is prepared (Step S13). Then, the support 11 is immersed in a solution in which the seed crystals are dispersed, and the seed crystals are thereby attached onto the support 11 (step S14). The support 11 is immersed in the solution, for example, in a state where the longitudinal direction thereof is substantially in parallel with the direction of gravity. Specifically, the inner surface of each through hole 111 is a substantially vertical plane substantially in parallel with the direction of gravity (i.e., a plane with the normal substantially facing in the horizontal direction). Each through hole 111 is filled with the solution in which the seed crystals are dispersed. Then, the solution in each through hole 111 is sucked from an inner surface of the through hole 111 into the support 11. The seed crystals contained in the solution do not pass through the support 11 but remain on the inner surface of each through hole 111 and are attached to the inner surface. Seed crystals attachment support is thereby produced. Further, the seed crystals may be attached on the support 11 by any other method.

The support 11 on which the seed crystals are attached in Step S14 (i.e., the seed crystals attachment support) is immersed in a precursor solution. Then, zeolite is caused to grow from the seed crystals as a nucleus by the hydrothermal synthesis, to thereby form the zeolite membranes 12 on the support 11 (Step S15). The temperature in the hydrothermal synthesis is preferably 110 degrees C. (° C.) to 200 degrees C. At that time, by adjusting a mixing ratio of a phosphorus source and a structure-directing agent (hereinafter, also referred to as an "SDA") in the precursor solution, or the like, the zeolite membrane 12 which is oriented can be obtained. After that, by heating, the SDA in the zeolite membrane 12 is decomposed and removed (Step S16). In Step S16, the SDA in the zeolite membrane 12 may be completely removed or may partially remain.

Figure 4:
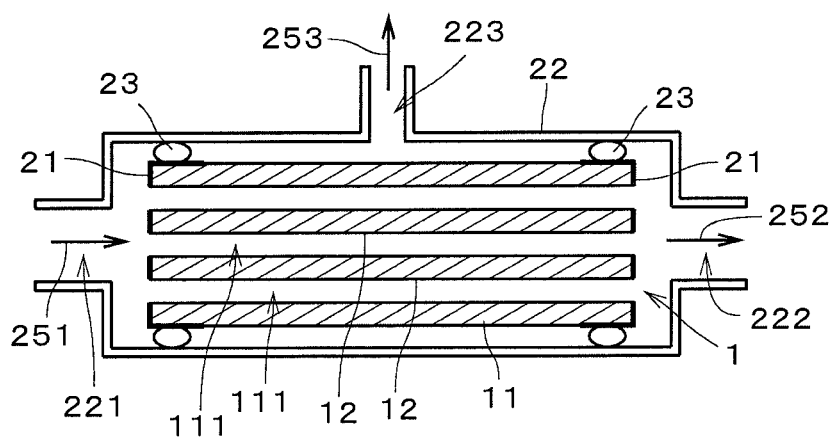
FIG. 4 is a view showing an apparatus for separating a mixed gas.

Next, with reference to FIG. 4, separation of a mixed substance using the zeolite membrane complex 1 will be described. FIG. 4 is a view showing a separation apparatus 2. In the separation apparatus 2, a mixed substance containing a plurality of types of fluids (i.e., gases or liquids) is supplied to the zeolite membrane complex 1, and a substance with high permeability in the mixed substance is caused to permeate the zeolite membrane complex 1, to be thereby separated from the mixed substance. Separation in the separation apparatus 2 may be performed, for example, in order to extract a substance with high permeability from a mixed substance, or in order to concentrate a substance with low permeability.

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called $NO_x$ such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_x$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Furthermore, the C3 to C8 hydrocarbons may either be a saturated hydrocarbon (i.e., in which there is no double bond or triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane (CH ($CH_3)_3$), 1-butene ($CH_2$=$CHCH_2CH_3$), 2-butene ($CH_3CH$=$CHCH_3$), or isobutene ($CH_2$=C ($CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH$ (OH) $CH_3$), ethylene glycol ($CH_2$ (OH) $CH_2$ (OH)), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether ($(CH_3)_2O$), methyl ethyl ether ($C_2H_5OCH_3$), diethyl ether ($(C_2H_5)_2O$), or the like.

The above-described ketone is, for example, acetone ($(CH_3)_2CO$), methyl ethyl ketone ($C_2H_5COCH_3$), diethyl ketone ($(C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

The following description will be made, assuming that a mixed substance to be separated by the separation apparatus 2 is a mixed gas containing a plurality of types of gases.

The separation apparatus 2 includes the zeolite membrane complex 1, sealing parts 21, an outer cylinder 22, and two sealing members 23. The zeolite membrane complex 1, the sealing parts 21, and the sealing members 23 are accommodated in the outer cylinder 22.

The sealing parts 21 are members which are attached to both end portions in the longitudinal direction (i.e., in the left and right direction of FIG. 4) of the support 11 and cover and seal both end surfaces in the longitudinal direction of the support 11 and outer surfaces in the vicinity of the end surfaces. The sealing parts 21 prevent gas from flowing into or out from both end surfaces of the support 11. The sealing part 21 is, for example, a plate-like member formed of glass or a resin. The material and the shape of the sealing part 21 may be changed as appropriate. Further, since the sealing part 21 is provided with a plurality of openings which coincide with the plurality of through holes 111 of the support 11, both ends of each through hole 111 of the support 11 in the longitudinal direction are not covered by the sealing parts 21. Therefore, gas or the like can flow into and out from the through hole 111 from both ends thereof.

The outer cylinder 22 is a tubular member having a substantially cylindrical shape. The outer cylinder 22 is formed of, for example, stainless steel or carbon steel. The longitudinal direction of the outer cylinder 22 is substantially in parallel with the longitudinal direction of the zeolite membrane complex 1. A supply port 221 is provided at an end portion on one side in the longitudinal direction of the outer cylinder 22 (i.e., an end portion on the left side in FIG. 4), and a first exhaust port 222 is provided at another end portion on the other side. A second exhaust port 223 is provided on a side surface of the outer cylinder 22. The internal space of the outer cylinder 22 is a sealed space that is isolated from the space around the outer cylinder 22.

The two sealing members 23 are arranged around the entire circumference between the outer surface of the zeolite membrane complex 1 and the inner surface of the outer cylinder 22 in the vicinity of both end portions in the longitudinal direction of the zeolite membrane complex 1. Each of the sealing members 23 is a substantially annular member formed of a material that gas cannot permeate. The sealing member 23 is, for example, an O-ring formed of a flexible resin. The sealing members 23 come into close contact with the outer surface of the zeolite membrane complex 1 and the inner surface of the outer cylinder 22 around the entire circumferences thereof. In the exemplary case shown in FIG. 4, the sealing members 23 come into close contact with outer surfaces of the sealing parts 21 and indirectly come into close contact with the outer surface of the zeolite membrane complex 1 with the sealing parts 21 interposed therebetween. The portions between the sealing members 23 and the outer surface of the zeolite membrane complex 1 and between the sealing members 23 and the inner surface of the outer cylinder 22 are sealed, and it is thereby mostly or completely impossible for gas to pass through the portions.

When separation of the mixed gas is performed, a mixed gas containing a plurality of types of gases with different permeabilities for the zeolite membrane 12 is supplied into the internal space of the outer cylinder 22 through the supply port 221. For example, the main component of the mixed gas includes $CO_2$ and $CH_4$. The mixed gas may contain gases other than $CO_2$ and $CH_4$. The pressure (i.e., introduction pressure) of the mixed gas to be supplied into the internal space of the outer cylinder 22 is, for example, 0.1 MPa to 20.0 MPa. The temperature for separation of the mixed gas is, for example, 10 degrees C. to 200 degrees C.

The mixed gas supplied to the outer cylinder 22 is introduced from the left end of the zeolite membrane complex 1 in FIG. 4 into the inside of each through hole 111 of the support 11 as indicated by the arrow 251. Gas with high permeability (which is, for example, $CO_2$, and hereinafter is referred to as a "high permeability substance") in the mixed gas permeates the zeolite membrane 12 formed on the inner surface of each through hole 111 and the support 11, and is led out from the outer surface of the support 11. The high permeability substance is thereby separated from gas with low permeability (which is, for example, $CH_4$, and hereinafter is referred to as a "low permeability substance") in the mixed gas. The gas (hereinafter, referred to as a "permeable substance") led out from the outer surface of the support 11 is collected through the second exhaust port 223 as indicated by the arrow 253. The pressure (i.e., permeation pressure) of the gas collected through the second exhaust port 223 is, for example, about 1 atmospheric pressure (0.101 MPa).

Further, in the mixed gas, gas (hereinafter, referred to as a "non-permeable substance") other than the gas which has permeated the zeolite membrane 12 and the support 11 passes through each through hole 111 of the support 11 from the left side to the right side in FIG. 4 and is collected through the first exhaust port 222 as indicated by the arrow 252. The pressure of the gas collected through the first exhaust port 222 is, for example, substantially the same as the introduction pressure. The non-permeable substance may include a high permeability substance that has not permeated the zeolite membrane 12, as well as the above-described low permeability substance.

Next, one example of production of the zeolite membrane complex 1 will be described.

<Production of Seed Crystals>

As the aluminum source, the phosphorus source, and the SDA (structure-directing agent), aluminum isopropoxide, 85% phosphoric acid, and 1,4-diazabicyclo [2.2.2] octane-C4-diquat hydroxide, respectively, are dissolved in pure water, and a precursor solution having composition of 1 $Al_2O_3$: 1 $P_2O_5$: 0.8 SDA: 200 $H_2O$ is thereby produced. This precursor solution is hydrothermally synthesized at 190 degrees C. for 50 hours. The original crystals acquired by the hydrothermal synthesis are collected and sufficiently washed with pure water, and then dried at 100 degrees C. As a result of the X-ray diffraction measurement, it is found that the acquired original crystals are crystals of SAT-type zeolite.

The original crystals are put into pure water so as to have 7 to 8 weight percentage, and pulverized by the ball mill for 2 days, 7 days, and 14 days, to thereby obtain three types of seed crystals. As a result of the X-ray diffraction measurement, it is found that the acquired seed crystals are crystals of SAT-type zeolite. Regardless of the pulverization times, the original crystals are pulverized at 330 rpm as the number of rotations in the first part of pulverization, and pulverized at 170 rpm as the number of rotations in the second part. The pulverization time in the first part is one day.

When the total pulverization time (i.e., the total of the pulverization time in the first part and that in the second part) for the original crystals is 2 days, the specific surface area of the seed crystals is about 21 $m^2/g$. Further, the strength obtained from the crystal component at the diffraction angle $2\theta$ indicating the maximum peak in a range of diffraction angle $2\theta$ from 12° to 25° in an X-ray diffraction pattern obtained by emitting X-ray to the seed crystals is about 23 times that obtained from the amorphous component. The diffraction angle $2\theta$ indicating the maximum peak is 21°.

When the total pulverization time for the original crystals is 7 days, the specific surface area of the seed crystals is about 59 $m^2/g$. Further, the strength obtained from the crystal component at the diffraction angle $2\theta$ indicating the maximum peak in a range of diffraction angle $2\theta$ from 12° to 25° in an X-ray diffraction pattern obtained by emitting X-ray to the seed crystals is about 1.3 times that obtained from the amorphous component. The diffraction angle $2\theta$ indicating the maximum peak is 21°.

When the total pulverization time for the original crystals is 14 days, the specific surface area of the seed crystals is about 103 $m^2/g$. Further, the strength obtained from the crystal component at the diffraction angle $2\theta$ indicating the maximum peak in a range of diffraction angle $2\theta$ from 12° to 25° in an X-ray diffraction pattern obtained by emitting X-ray to the seed crystals is about 0.3 times that obtained from the amorphous component. The diffraction angle $2\theta$ indicating the maximum peak is 21°.

As described above, as the total pulverization time for the original crystals is longer, the ratio of the strength obtained from the crystal component to that obtained from the amorphous component becomes smaller. Specifically, due to the pulverization of the original crystals, the crystal component decreases and the amorphous component increases.

<Production of Zeolite Membrane>

A porous monolith support 11 formed of alumina is prepared. The support 11 is immersed in a solution in which the seed crystals are dispersed, and the seed crystals are thereby attached onto the inner surface of each through hole 111 of the support 11. After that, as the aluminum source, the phosphorus source, and the SDA, aluminum isopropoxide, 85% phosphoric acid, and 1,4-diazabicyclo [2.2.2] octane-C4-diquat hydroxide, respectively, are dissolved in pure water, and a precursor solution having composition of 1 $Al_2O_3$: 2 $P_2O_5$: 2.3 SDA: 1000 $H_2O$ is thereby produced.

The support 11 with the seed crystals attached thereto is immersed in the precursor solution and hydrothermally synthesized at 170 degrees C. for 50 hours. SAT-type zeolite membranes 12 are thereby formed on the support 11. After the hydrothermal synthesis, the support 11 and the zeolite membranes 12 are sufficiently washed with pure water, and then dried at 100 degrees C. As a result of the X-ray diffraction measurement, it is found that the acquired zeolite membrane 12 is formed of SAT-type zeolite.

After drying the support 11 and the zeolite membranes 12, the $N_2$ (nitrogen) permeation amount through the zeolite membrane 12 is measured. The $N_2$ permeation amount through the zeolite membrane 12 formed by using the seed crystals obtained by pulverization for the total pulverization time of 2 days and that through the zeolite membrane 12 formed by using the seed crystals obtained by pulverization for the total pulverization time of 7 days are each not larger than 0.005 nmol/$m^2$·s·P. It is thereby confirmed that the zeolite membrane 12 formed by using the seed crystals obtained by pulverization for the total pulverization time of 2 days to 7 days is dense enough for practical use. On the other hand, the $N_2$ permeation amount through the zeolite membrane 12 formed by using the seed crystals obtained by pulverization for the total pulverization time of 14 days is 0.2 nmol/$m^2$·s·P, and it is confirmed that the zeolite membrane has not suitably grown as compared with the case using the seed crystals obtained by pulverization for the total pulverization time of 2 days or 7 days. After that, heat treatment is performed on the zeolite membrane 12 at 500 degrees C. for 50 hours, to thereby combustion-remove the SDA and cause the micropores in the zeolite membrane 12 to pierce the zeolite membrane 12.

<Gas Separation Test>

Next, a separation test for a mixed gas is carried out by using an apparatus having a schematic structure shown in FIG. 4. As described above, the zeolite membranes 12 are formed on the respective inner surfaces of the plurality of through holes 111 provided in the support 11. Both end portions of the support 11 are sealed with the sealing part 21, and the support 11 is accommodated in the outer cylinder 22. In this state, the mixed gas is introduced into each through hole 111 of the support 11 as indicated by the arrow 251 and the gas which has permeated the zeolite membrane 12 is collected from the second exhaust port 223 provided in the outer cylinder 22 as indicated by the arrow 253.

The gas introduction pressure in the separation test is 0.2 MPaG. As the above-described mixed gas, the gas with a ratio between the $CO_2$ and $CH_4$ being 50:50 is used. As a result, the permeance ratio of $CO_2/CH_4$ in the zeolite membrane 12 formed by using the seed crystals obtained by pulverization for the total pulverization time of 2 days is 1705. Further, the permeance ratio of $CO_2/CH_4$ in the zeolite membrane 12 formed by using the seed crystals obtained by pulverization for the total pulverization time of 7 days is 1800. It is thereby confirmed that the zeolite membrane 12 formed by using the seed crystals obtained by pulverization for the total pulverization time of 2 days to 7 days has enough separation performance for practical use.

As described above, the above-described seed crystals are crystals of zeolite to be attached onto the support 11 in production of the zeolite membrane complex 1. The specific surface area of the seed crystals is not smaller than 10 $m^2$/g and not larger than 150 $m^2$/g. It is thereby possible to densely attach the seed crystals onto the support 11 with a substantially uniform thickness.

As described above, the strength obtained from the crystal component at the diffraction angle 2θ indicating the maximum peak in a range of diffraction angle 2θ from 12° to 25° in an X-ray diffraction pattern obtained by emitting X-ray to the seed crystals is not less than once and not more than 30 times that obtained from the amorphous component. Thus, by setting the strength obtained from the crystal component to be not more than 30 times that obtained from the amorphous component, it is possible to make the proportion of the amorphous component in the seed crystals relatively large and improve the adherence of the seed crystals to the support 11. As a result, it is possible to densely and uniformly attach the seed crystals onto the support 11. Further, by setting the strength obtained from the crystal component to be not less than once that obtained from the amorphous component, it is possible to prevent the proportion of the crystal component in the seed crystals from becoming excessively small and cause the zeolite to suitably grow in the formation of the zeolite membrane 12. As a result, it is possible to form a dense zeolite membrane 12 on the support 11.

These seed crystals are easily attached onto the support 11, and therefore suitable for seed crystals of zeolite (for example, zeolite containing any two or more of Si, Al, and P or Si) which are required to improve the adherence to the support. Further, these seed crystals are especially suitable for seed crystals of zeolite (for example, zeolite containing at least Al, P, and O) which are conventionally thought to be hard to be attached onto a general-type support.

These seed crystals achieve improvement in the adherence to the support as described above, and therefore especially suitable for seed crystals to be attached to a plane (for example, a substantially vertical plane in production of the zeolite membrane complex 1) on which seed crystals are hard to be attached due to the gravity effect, out of the surface of the support 11. From the same point of view, these seed crystals are especially suitable for seed crystals to be attached to a downward-facing plane in production of the zeolite membrane complex 1, out of the surface of the support 11. In any case, it is possible to densely and uniformly attach the seed crystals onto the support 11. Further, the above-described downward-facing plane is a plane whose normal is downward from the horizontal direction, and includes both a plane whose normal is vertically downward and a plane whose normal is diagonally downward. As a matter of course, the seed crystals may be attached to any plane facing in any direction such as an upward-facing plane or the like, only if attached to the surface of the support 11.

As described above, the support 11 is porous. It is thereby possible to use the zeolite membrane 12 as a separation membrane (e.g., a gas separation membrane) in the zeolite membrane complex 1. Further, the support 11 is an alumina sintered body or a mullite sintered body. It is thereby possible to further improve the adherence of the seed crystals to the support 11.

As described above, the method of producing the seed crystals includes a step of producing zeolite by hydrothermal synthesis and acquiring original crystals from the zeolite (Step S11) and a step of pulverizing the original crystals, to thereby form seed crystals (Step S12). The specific surface area of the seed crystals produced in Step S12 is not smaller than 10 $m^2$/g and not larger than 150 $m^2$/g. Further, the strength obtained from the crystal component at the diffraction angle 2θ indicating the maximum peak in a range of diffraction angle 2θ from 12° to 25° in an X-ray diffraction pattern obtained by emitting X-ray to the seed crystals is not less than once and not more than 30 times that obtained from the amorphous component. It is thereby possible to suitably produce seed crystals having high adherence to the support 11.

As described above, the step of pulverizing the original crystals (Step S12) includes a step of pulverizing the original crystals by the ball mill or the bead mill rotating at the first number of rotations (Step S121) and a step of pulverizing the original crystals by the ball mill or the bead mill rotating at the second number of rotations which is lower than the first number of rotations, to thereby form the seed crystals (Step S122). In Step S121, by using the ball mill or the bead mill rotating at relatively high speed, it is possible to pulverize the original crystals with high efficiency. As the pulverization of the original crystals proceeds, the viscosity of a liquid (i.e., a liquid in which the original crystals and the like are dispersed) in the ball mill or the bead mill increases. In Step S122, by reducing the number of rotations of the ball mill or the bead mill, it is possible to prevent or suppress attachment of the liquid having increased viscosity to an inner surface of a mill container due to the centrifugal force or the like. As a result, it is possible to suitably pulverize the original crystals.

As the aluminum source in the precursor solution used in the above-described production of the original crystals, the seed crystals, and the zeolite membrane 12, instead of aluminum isopropoxide, other materials belonging to aluminum hydroxide, aluminum alkoxide or alumina sol may be used. Further, aluminum hydroxide, aluminum alkoxide or alumina sol may be used only for production of the original crystals and the seed crystals, or may be used for production of the zeolite membrane 12. When an aluminum source is used in the hydrothermal synthesis in the production of the original crystals, it is preferable that aluminum hydroxide, aluminum alkoxide or alumina sol is used as the aluminum source. It is thereby possible to obtain the original crystals and the seed crystals having high crystallinity and high uniformity of particle diameter. Further, in the production of the original crystals, the seed crystals, and the zeolite membrane, an aluminum source other than aluminum hydroxide, aluminum alkoxide, or alumina sol may be used.

The above-described seed crystals and method of producing the same allow various variations.

For example, in the production of the seed crystals, in the step of pulverizing the original crystals (Step S12), the number of rotations of the ball mill or the bead mill may be changed in three or more stages. For example, between Step S121 and Step S122, a step of pulverizing the original crystals by the ball mill or the bead mill rotating at a number of rotations lower than the first number of rotations and higher than the second number of rotations may be provided.

Only if the specific surface area of the seed crystals produced in Step S12 is not smaller than 10 $m^2/g$ and not larger than 150 $m^2/g$ and the strength obtained from the crystal component at the diffraction angle 2θ indicating the maximum peak in a range of diffraction angle 2θ from 12° to 25° in an X-ray diffraction pattern obtained by emitting X-ray to these seed crystals is not less than once and not more than 30 times that obtained from the amorphous component, the number of rotations of the ball mill or the bead mill may be maintained constant during the pulverization of the original crystals. Further, the pulverization of the original crystals may be performed by a pulverizer other than the ball mill or the bead mill. Alternatively, the original crystals may be used as the seed crystals, being not pulverized. In any case, it is possible to suitably produce seed crystals having high adherence to the support 11.

On the other hand, only if the step of pulverizing the original crystals (Step S12) includes the step of pulverizing the original crystals by the ball mill or the bead mill rotating at the first number of rotations (Step S121) and a step of pulverizing the original crystals by the ball mill or the bead mill rotating at the second number of rotations which is lower than the first number of rotations, to thereby form the seed crystals (Step S122), the specific surface area of the seed crystals may be smaller than 10 $m^2/g$, or may be larger than 150 $m^2/g$. Further, by additionally changing the pulverization condition, the cases have been checked, where the specific surface area of the seed crystals is smaller than 10 $m^2/g$ and where the specific surface area is larger than 150 $m^2/g$. When the specific surface area of the seed crystals is smaller than 10 $m^2/g$, it is confirmed that the adherence of the seed crystals to the support 11 is reduced to some degree, as compared with the case where the specific surface area of the seed crystals is not smaller than 10 $m^2/g$ and not larger than 150 $m^2/g$. When the specific surface area of the seed crystals is larger than 150 $m^2/g$, it is confirmed that the growth of zeolite is suppressed to some degree in the production of the zeolite membrane 12, as compared with the case where the specific surface area of the seed crystals is not smaller than 10 $m^2/g$ and not larger than 150 $m^2/g$. Further, the strength obtained from the crystal component in the above-described X-ray diffraction pattern may be less than once that obtained from the amorphous component, or may be more than 30 times. Even in these cases, it is possible to suitably pulverize the original crystals.

The seed crystals and the zeolite membrane 12 are not limited to those of SAT-type zeolite, but may be those of zeolite having any other structure. The seed crystals and the zeolite membrane 12 do not have to be pure aluminophosphate, but may contain any other element. For example, the seed crystals and the zeolite membrane 12 may contain a Mg atom, Si atom, or the like. Further, the seed crystals and the zeolite membrane 12 do not necessarily have to contain two or more of Si, Al, and P. Furthermore, the seed crystals and the zeolite membrane 12 do not necessarily have to contain Si.

As to the above-described seed crystals (specifically, in which the specific surface area is not smaller than 10 $m^2/g$ and not larger than 150 $m^2/g$ and the strength obtained from the crystal component at the above-described diffraction angle 2θ in an X-ray diffraction pattern is not less than once and not more than 30 times that obtained from the amorphous component), besides for the above-described SAT-type zeolite, for DDR-type zeolite containing Si, CHA-type zeolite containing Si and Al, AFX-type zeolite containing Si, Al, and P, AEI-type zeolite containing Al and P, and ERI-type zeolite containing Al and P, it is similarly confirmed that the adherence of the seed crystals to the support can be improved.

The zeolite membrane complex 1 may further include a function layer or a protective layer laminated on the zeolite membrane 12. Such a function layer or a protective layer is not limited to the zeolite membrane, but may be an inorganic membrane such as a carbon membrane, a silica membrane, or the like, or an organic membrane such as a polyimide membrane, a silicone membrane, or the like.

The configurations in the above-discussed preferred embodiments and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2018-056677 filed in the Japan Patent Office on Mar. 23, 2018 and Japanese Patent Application No. 2019-042381 filed in the Japan Patent Office on Mar. 8, 2019, the entire disclosures of which are incorporated herein by reference.

REFERENCE SIGNS LIST

1 Zeolite membrane complex
11 Support
12 Zeolite membrane
S11 to S16, S121, S122 Step

The invention claimed is:

1. Zeolite seed crystals that are to be attached onto a support when producing a zeolite membrane complex comprising said support and a zeolite membrane formed on said support, wherein
the specific surface area is not smaller than 10 m$^2$/g and not larger than 150 m$^2$/g, and
the strength obtained from a crystal component at a diffraction angle 2θ indicating a maximum peak in a range of diffraction angle 2θ from 12° to 25° in an X-ray diffraction pattern obtained by emitting X-ray to said seed crystals is not less than once and not more than 30 times that obtained from an amorphous component.

2. The zeolite seed crystals according to claim 1, containing:
any two or more of silicon, aluminum, and phosphorus, or silicon.

3. The zeolite seed crystals according to claim 2, containing:
at least aluminum, phosphorus, and oxygen.

4. The zeolite seed crystals according to claim 1, wherein the tap density is not lower than 0.2 g/cm$^3$ and not higher than 1.0 g/cm$^3$.

5. A method of producing seed crystals of zeolite which is to be attached onto a support in production of a zeolite membrane complex comprising said support and a zeolite membrane formed on said support, comprising:
a) producing zeolite by hydrothermal synthesis and acquiring original crystals from said zeolite; and
b) pulverizing said original crystals, to thereby form seed crystals in which the specific surface area is not smaller than 10 m$^2$/g and not larger than 150 m$^2$/g and the strength obtained from a crystal component at a diffraction angle 2θ indicating a maximum peak in a range of diffraction angle 2θ from 12° to 25° in an X-ray diffraction pattern obtained by emitting X-ray to said seed crystals is not less than once and not more than 30 times that obtained from an amorphous component.

6. The method of producing seed crystals of zeolite according to claim 5, wherein
said operation b) comprises:
b1) pulverizing said original crystals by a ball mill or a bead mill rotating at a first number of rotations; and
b2) pulverizing said original crystals which are pulverized in said operation b1), by said ball mill or said bead mill rotating at a second number of rotations which is lower than said first number of rotations, to thereby form said seed crystals.

7. The method of producing seed crystals of zeolite according to claim 5, wherein
when an aluminum source is used in the hydrothermal synthesis in said operation a), aluminum hydroxide, aluminum alkoxide or alumina sol is used as said aluminum source.

8. A method of producing seed crystals attachment support, comprising:
preparing a support; and
attaching seed crystals produced by said method of producing seed crystals of zeolite according to claim 5 onto said support.

9. A method of producing a zeolite membrane complex, comprising:
immersing seed crystals attachment support produced by said method of producing seed crystals attachment support according to claim 8 in a precursor solution, and causing zeolite to grow from said seed crystals by hydrothermal synthesis, to thereby form a zeolite membrane on said support; and
removing a structure-directing agent from said zeolite membrane.

10. The zeolite seed crystals according to claim 1, containing magnesium.

\* \* \* \* \*